US010235640B2

(12) United States Patent
Devarakonda et al.

(10) Patent No.: US 10,235,640 B2
(45) Date of Patent: Mar. 19, 2019

(54) COST-BASED MIGRATION WAVES PLANNING

(75) Inventors: Murthy Devarakonda, Peekskill, NY (US); Nikolai A. Joukov, Thornwood, NY (US); Birgit M. Pfitzmann, Valhalla, NY (US); Lawrence H. Thompson, Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 579 days.

(21) Appl. No.: 12/938,776

(22) Filed: Nov. 3, 2010

(65) Prior Publication Data

US 2012/0109844 A1    May 3, 2012

(51) Int. Cl.
*G06Q 10/00* (2012.01)
*G06Q 10/06* (2012.01)

(52) U.S. Cl.
CPC .......... *G06Q 10/00* (2013.01); *G06Q 10/067* (2013.01)

(58) Field of Classification Search
CPC ....... G06Q 10/00; G06Q 30/00; G06Q 10/067
USPC ........................................... 705/1.1, 80, 500
See application file for complete search history.

(56) References Cited

U.S. PATENT DOCUMENTS

| | | | | |
|---|---|---|---|---|
| 7,616,583 B1 * | 11/2009 | Power | ................... | G06Q 10/06 370/252 |
| 7,627,493 B1 * | 12/2009 | Sarthi et al. | ................. | 705/7.22 |
| 7,818,410 B1 * | 10/2010 | Barnes | .................. | G06F 9/4856 709/223 |
| 7,885,848 B2 * | 2/2011 | Kagan | ................... | G06Q 10/06 |
| 7,890,389 B2 * | 2/2011 | Harel et al. | ...................... | 705/28 |
| 8,032,523 B2 * | 10/2011 | Hamilton, II | ........ | G06F 1/3203 707/720 |
| 8,095,929 B1 * | 1/2012 | Ji | .......................... | G06F 9/4856 709/223 |
| 2004/0194055 A1 * | 9/2004 | Galloway et al. | ............ | 717/101 |
| 2006/0190417 A1 * | 8/2006 | Hilkemeyer et al. | ......... | 705/400 |
| 2010/0049587 A1 * | 2/2010 | Dunetz | .................. | G06Q 10/06 705/7.37 |
| 2010/0241615 A1 * | 9/2010 | Marshall et al. | ............ | 707/661 |

OTHER PUBLICATIONS

Geay, E., et al. "Modular String-Sensitive Permission Analysis With Demand-Driven Precision" 31st International Conference on Software Engineering, ICSE 2009. May 2009 pp. 1-11.
Joukov, N., et al. "Built-to-Order Service Engineering for Enterprise IT Discovery" 2008 IEEE International Conference on Services Computing (SCC 2008). Jul. 2008 pp. 1-8.
Magoutis, K., et al. "Galapagos: Model-Driven Discovery of End-to-End Application-Storage Relationships in Distributed Systems" IBM Journal of Research and Development. vol. 52, No. 4/5. Jul./Sep. 2008. pp. 367-377.

* cited by examiner

*Primary Examiner* — Kira Nguyen
(74) *Attorney, Agent, or Firm* — Tutunjian & Bitetto, P.C.; Kurt Goudy (57) ABSTRACT

A system and method for cost-based migration planning includes determining cost factors and constraints associated with at least one of migrating and transforming a plurality of components. A cost-based model is constructed using the cost factors and constraints. The cost-based model is applied to groupings of the plurality of components to provide a cost-based determination grouping scheme in accordance with the constraints. The grouping scheme is output to provide migration waves for migrating or transforming the plurality of components.

25 Claims, 7 Drawing Sheets

COST-BASED MIGRATION WAVES PLANNING

BACKGROUND

Technical Field

The present invention relates to migration planning in computer environments and more particularly to systems and methods for planning migration waves based on cost.

Description of the Related Art

In data center relocation and other migration and transformation activities, it is desirable to make these activities more efficient. One such method includes creating plan groups in which to relocate a certain subset of a plurality of objects at once.

Methods for grouping objects are complex, and many factors may be present which influence which objects are migrated in which order. There is ultimately no way yet to say whether one affinity grouping is better than another.

SUMMARY

A system and method for cost-based migration planning includes determining cost factors and constraints associated with at least one of migrating and transforming a plurality of components. A cost-based model is constructed using the cost factors and constraints. The cost-based model is applied to groupings of the plurality of components to make a cost-based determination of a grouping scheme in accordance with the constraints. The grouping scheme is output to provide migration waves for migrating or transforming the plurality of components.

A system for cost-based migration planning includes a processor and a memory coupled to the processor. The memory stores a cost-based planning tool which is executed by the processor to determine cost factors and constraints associated with at least one of migrating and transforming a plurality of components; construct at least one cost-based model using the cost factors and constraints; apply the at least one cost-based model to groupings of the plurality of components to determine a cost-based grouping scheme in accordance with the constraints; and output the grouping scheme to provide migration waves for at least one of migrating and transforming the plurality of components.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, systems and methods to plan affinity groups aiming for minimal cost are provided. Cost models for affinity groups are introduced in migration and transformation activities, in particular in data center relocations, to improve efficiency and cost. A generic cost model includes multiple cost factors occurring in data center relocations. The cost model may be customized with actual costs (e.g., local labor costs) in a specific situation. Aspects of the objects to be relocated and their dependencies that contribute to the costs can be determined by automated discovery. The cost model may be employed in a what-if-scenario, e.g., to compute and compare the costs of multiple affinity groupings by existing methods or manually, or by using a problem solver to determine an optimal or heuristically good solution. The cost model may also include a risk model. In one instance, costs may be associated with probability distributions, e.g., of being late with certain tasks.

Costs of migration may be defined based on parameters such as how to split a data center into waves and how to order or prioritize waves. Cost includes the cost of migration (mostly independent of the order of migration) and the cost of testing. Testing strongly depends on the order of migration. The cost functions may be complemented with other restrictions (such as, e.g., people available for concurrent migrations of a given type), and they may form a system of equations, inequalities and/or other ordered systems. These equations, etc. may be entered into a solver or other mechanism that computes a best partitioning of a data center into waves and waves ordering (some waves can be migrated concurrently). Additional constraints can, of course, be specified as well (e.g., migrate application "A" last).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, and script programming languages, such as Perl. The program code may include existing solver code such as integer programming solvers. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. Component, as described herein, refers to both hardware and software components. Costs as referred to herein refers to monetary costs although other costs may be employed, e.g., tokens, or other abstractions.

Figure 1:
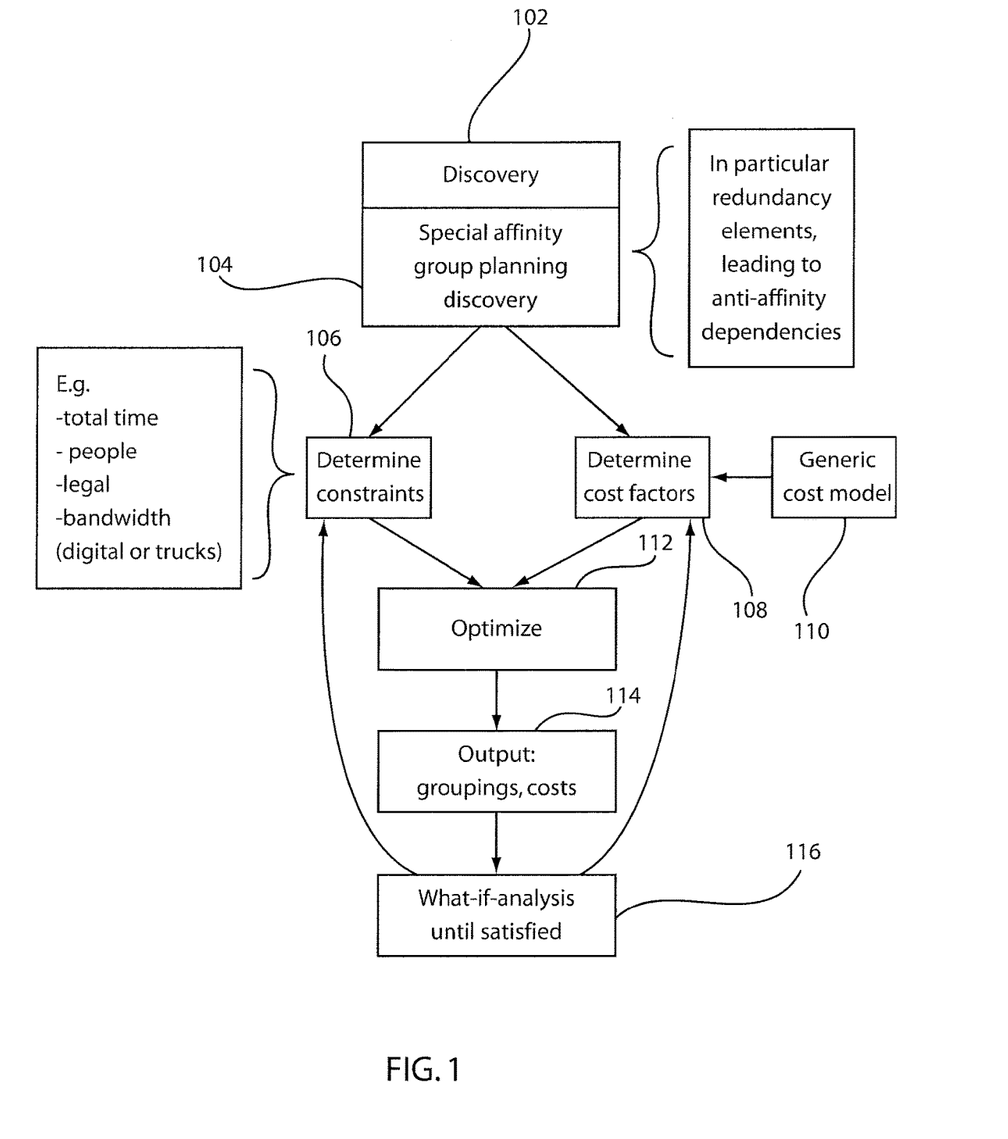
FIG. 1 is a block/flow diagram showing a system/method for cost-based migration planning in accordance with one embodiment.

Referring now to the drawings in which like numerals represent the same or similar elements and initially to FIG. 1, a block/flow diagram illustratively shows a migration/transformation grouping system/method based upon cost in accordance with one embodiment. In block 102, an initial discovery step may be provided to determine the objects to be relocated and their dependencies. The discovery may be skipped if the infrastructure and dependencies are already known. For data-center relocation, cross-server dependencies are of particular importance.

Figure 2:
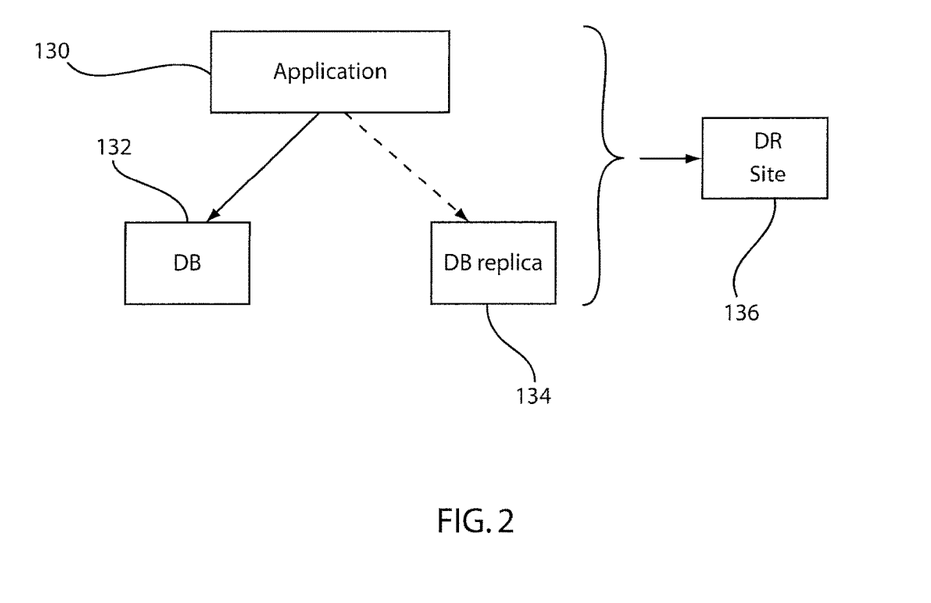
FIG. 2 is a block diagram showing an example of redundancy elements for migration.

In block 104, special affinity group planning discovery may be employed to indicate that specific aspects of the objects and in particular their dependencies may usefully be discovered for the following steps. These are, in particular, redundancy elements such as cluster configurations, backups, disaster recovery sites, etc. The special affinity group planning discovery may also include questionnaires for aspects that cannot be discovered automatically, e.g., permitted downtimes of systems, or are not yet discoverable. In FIG. 2, a scenario is depicted with redundant elements. An application 130 has dependencies to a database (e.g., DB) 132 and its replica 134. Furthermore, the application and the data are regularly copied to a disaster recovery site 136.

These dependencies can be treated differently (special affinity). For example, the DB 132 and DB replica 134 may be moved at different times so that at least one of them is always available, or the disaster recovery site might be actively used during the migration of the databases.

This special discovery may be integrated in the "normal" discovery phase or block 102, e.g., the new features may be added to an existing tool (such as IBM® Research's Galapagos™ technology or IBM®'s TADDM™ product).

The resulting knowledge from discovery in blocks 102 and 104 is employed to define constraints for affinity groupings in block 106. E.g., a constraint may be defined that includes a server and its backup should not be placed into a same affinity group. This constraint may be imposed due to the risk of a joint failure affecting both the server and its backup, e.g., if they are physically moved on a same truck. Constraints may include, e.g., total time, people involved, legal considerations, bandwidth, mode of migration (e.g., digital, physical transportation, etc.), budgets, permitted outage times, people constraints, downtime constraints, risk of data loss, risk of exceeding downtimes, etc. Constraints may be substituted with higher costs; however, clear constraints are preferred to restrict the search space.

The resulting knowledge of discovery in blocks 102 and 104 may also be employed to create an instance of a cost model. Costs factors are determined in block 108. The costs factors may be based on concrete information technology (IT) and financial information discovered and queried from people or other resources. Some cost factors may include actual move costs. Some actual move costs are per object, independent of the group that this object is moved in, and need not be considered for optimizing the grouping, as long as one is aware that the costs in the resulting cost model are not the overall migration costs. E.g., the packing and unpacking of a server that is physically moved is such a cost. Similarly, costs that concern the overall migration, such as shutting down an old data center once it is empty, can be omitted for comparison purposes if these costs would be the same for all choices.

Actual move costs that depend on the grouping are often proportional to the number of groups. E.g., if a group is a set of servers transported on one truck, the number of truck loads used largely determines the transport costs. Actual costs may include additional backup or disaster recovery (DR) sites to be used in the move, costs associated with address changes in the infrastructure and possibly in other components ("relinking" costs), etc. People costs are closely related to actual move costs. E.g., packers' time may only depend on the number of servers to be moved overall, while their travel costs may depend on how many groups are moved at different points in time.

Cost of business loss may be a factor. While objects are being migrated, they are not functional. If there is no replacement during that time, the missing functionality may be costly. The cost of business loss lends itself to a risk-based analysis. There may be change windows in which systems being migrated are allowed to be down, but the cost (to the business unit and/or to the migrating entity, via contractual penalties, etc.) rises significantly if the duration of the migration exceeds the change window.

Business losses may include outage costs, which occur per business application, e.g., each time at least one object is moved on which a business application depends. A business application might include, for example, a travel expense application, a product web catalog, a computer-aided manufacturing application, etc. (e.g., a larger IT entity, including one or more interacting software components, that fulfills overall requirements and has to be operational as a whole). There may be special smaller costs if a business application is only reduced in performance, e.g., because only one part of a high-availability group is migrated. There may also be higher communication costs to consider, e.g., if high-bandwidth transfer is needed between different data centers it is more expensive than, say, e.g., local communications for other portions of the move.

Another cost factor in migrations is testing. Moved objects need to be tested to determine whether they are working properly in their new environment. These costs include labor and computer down time. While some of the costs are per object, a large part is user acceptance tests, which are per business application.

A generic model 110 is employed to create a cost model for a given scenario from the cost factors and data. A generic model may be customized in accordance with the cost factors (block 108) to create a cost model instance for a particular migration or transformation. The generic cost model (110), the cost factors (108) and constraints (106) are used to optimize groupings in block 112. Optimization may include, e.g., running an optimization algorithm, and thus obtaining a good or even optimal grouping with a cost. Optimization may also include running one or more algorithms with multiple different inputs. Furthermore, optimization may include manually making one or more groupings, and then automatically computing the cost of each of these groupings. In cases with multiple results, a human can then make a choice, e.g., the grouping with the lowest cost.

In block 114, groupings and costs are output from block 112. This information may be provided to a user in block 116. Humans may also change constraints (block 106 and costs (block 108) in a what-if analysis. The changes to constraints and cost factors may continue until a goal is met, a threshold is reached or a user is satisfied.

More details about cost models in different types of moves or scenarios are illustratively shown using FIGS. 3-6. It should be understood that the images presented are for illustrative purposes and should not be construed as limiting. Other models and costs may be employed.

Figure 3:
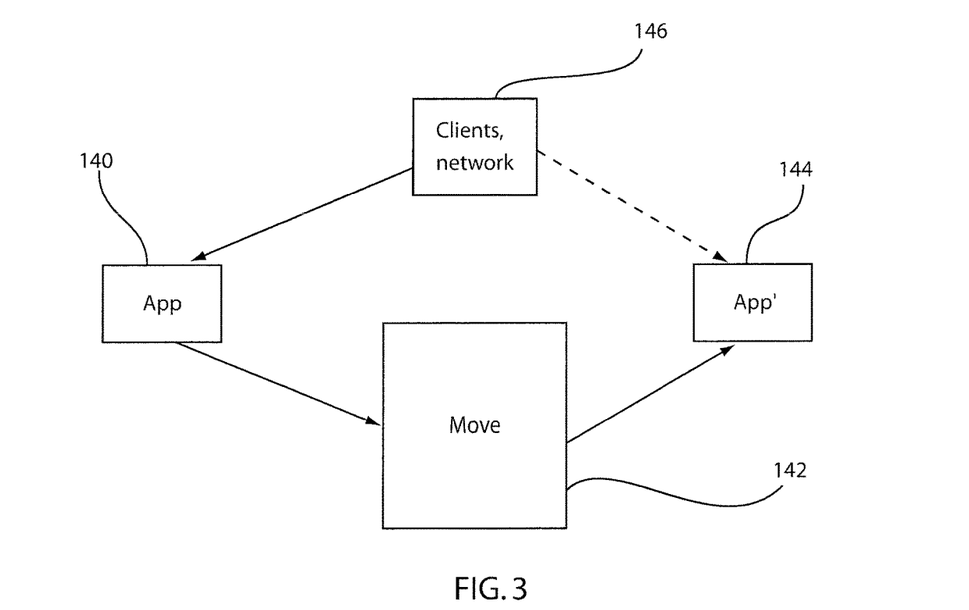
FIG. 3 is a block/flow diagram, showing an illustrative system/method for migrating components in accordance with a de-install/re-install method.

Referring to FIG. 3, a de-install/re-install scenario is illustratively depicted. In this scenario, an application 140 is switched off in a source environment, illustrated by a client network 146, and moved by truck or other physical transportation 142 to a target environment. The application 144 is switched on in the target environment and restarts interacting with the client network 146. The application 140 may include several possibly interacting servers, and in this illustrative example, it was assumed that the move group included exactly this one application.

This scenario includes costs for transport, outage, a switch-over, risk of not being on time, and risk of server loss including data. Relinking, if needed, incurs costs in all servers depending on moved servers, illustrated by the client network 146. Relinking is not needed if hostnames (DNS names, where DNS means Domain Name Service) remain the same in the target environment and if the client network 146 only addresses the moved application by its hostnames, or if the IP addresses remain the same. Tests of individual servers when restarting them in the target environment also incurs costs. End-user tests may also be needed (depending whether relinking is needed), and then incurs costs.

Figure 4:
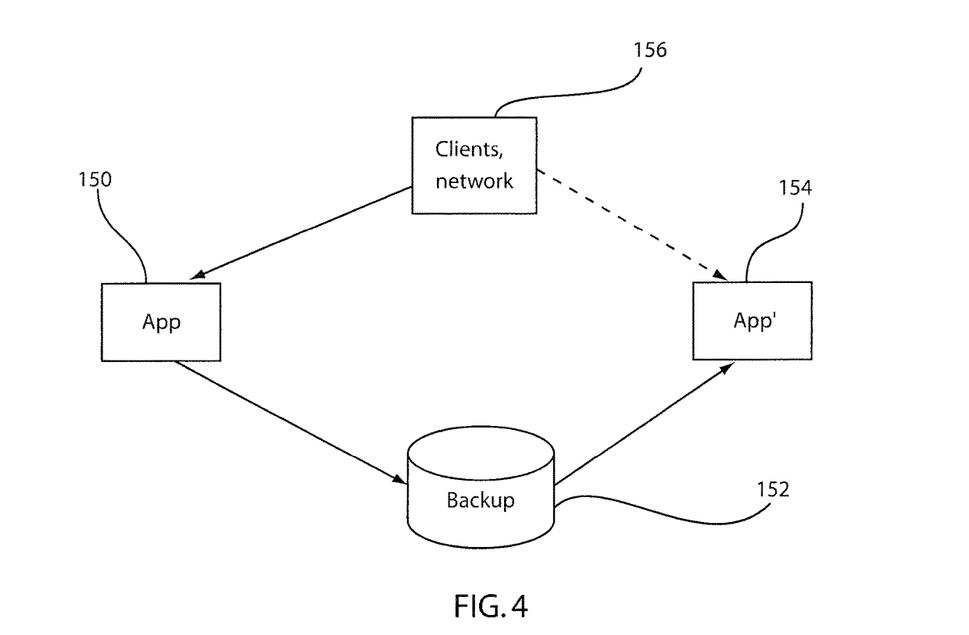
FIG. 4 is a block/flow diagram, showing an illustrative system/method for migrating components in accordance with a backup-restore method.

Referring to FIG. 4, a backup-restore cost model is illustratively shown. Beginning with the application 150, the application is backed up in storage 152. The application is migrated or restored in the new environment (application 154), switched on and tested locally. A client network 156 cuts over to using application 154. The backup and restore may be entirely done after stopping the application 150, or the application 150 is only stopped after a first backup is made and then a faster resynchronization is made. If a time-consuming data transfer is needed to the target environment as part of the restore operation, then even that may first be done before the application 150 is stopped and later a faster resynchronization may be performed.

Some illustrative costs in this scenario include backup space use costs, which is the product of the application size (e.g., maximum affinity group size) and the time for which the backup storage 152 is needed (e.g., approximate number of affinity groups), if not present. Also, more servers are needed than in the scenario of FIG. 3, because a new server is needed for the application 154 in the target environment before the source server of application 150 becomes free. Network bandwidth costs may include wide-area network costs, especially if different data centers are involved. The actual data transfer costs are independent of grouping, but lease costs for special communication lines may be involved and those may depend on the grouping.

Costs for outage time (servers off) may be involved (unless the application 150 is on during the entire time (e.g., application is read-only)). In this scenario, there is a risk of not starting properly and relinking may be needed as described with reference to FIG. 3. Testing is per business application and is more likely needed in this case.

Figure 5A:
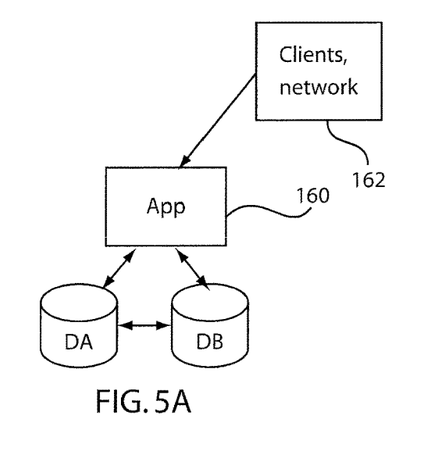
FIGS. 5A-5C show block/flow diagrams illustrating a system/method for migrating components in accordance with a workload shifting method.
Figure 5B:
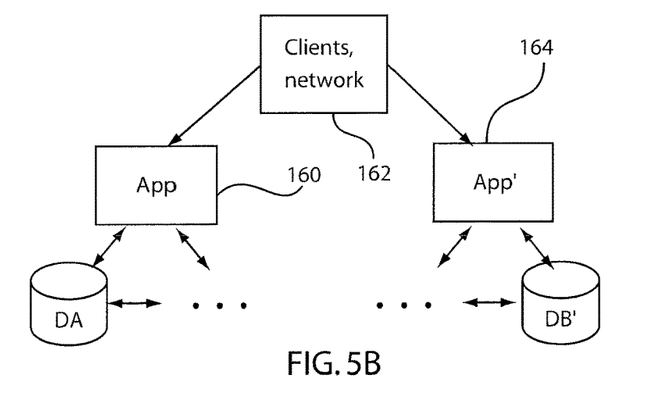
Figure 5C:
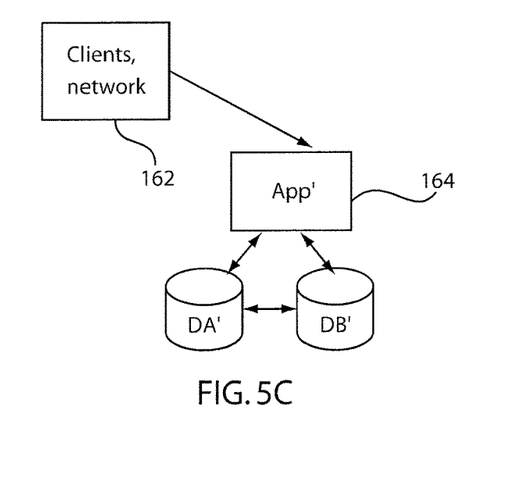

Referring to FIGS. 5A-5C, workload shifting is illustratively depicted. In FIG. 5A, an application 160 that can alternatively use two databases DA and DB needs to be transferred, i.e., DA and DB are replica of each other, and we assume that all persistent state of application 160 is stored in these databases. DB is switched off, and moved via network 162 or physically to DB'. The application 160, which is stateless, is copied to a new environment as application 164. In FIG. 5B, the application 164 and DB' are switched on and locally tested. If the test succeeds, application 164 and DB' are cut over to on the client's network 162. The application 160 and DA are switched off. DA may now be moved to become DA' or DB' may be replicated to create DA' locally while running. Local replication is faster and therefore may be less expensive. E.g., test DB and switch off application 160 and DA. Then, resynchronize DB' to the state of DA and cutover to application 164 and DB' before switching on DA' In FIG. 5C, DA' is switched on.

Costs associated with workload shifting may include a truck or wide-area network for transfer of DB and application 160, and a truck or bandwidth, possibly local, for DA. Additional servers may be needed at least for application 164 because it is started before its source version application 160 is switched off. Relinking in the client network 162 is needed as always, and it may also be needed as the potential exists for changes in application 160 and application 164 when the number of databases changes. Testing may include intensive end-user tests, as there is no outage. One may specifically want to test that database DA' really becomes usable (even though application 164 also works with DB' alone) so that one is sure one has a high-availability replicated system again.

Figure 6:
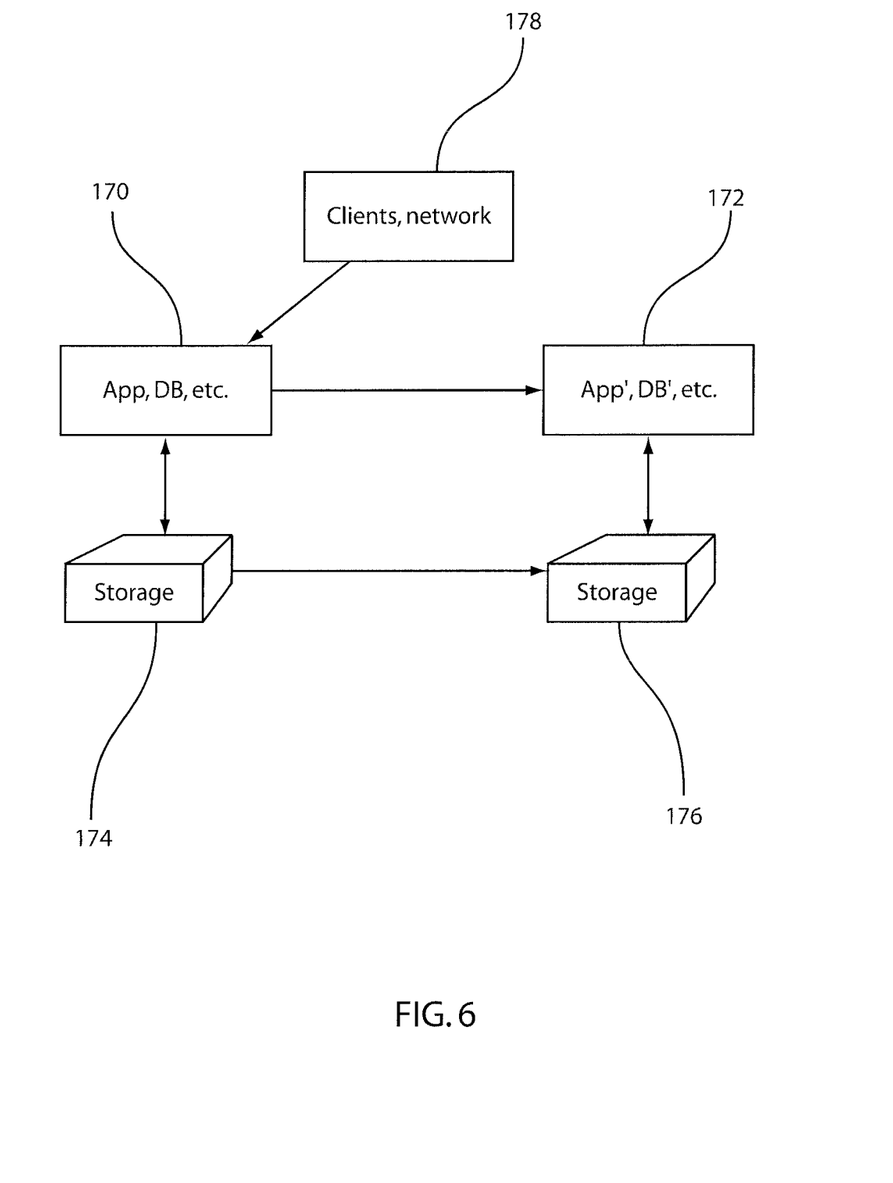
FIG. 6 is a block/flow diagram, showing an illustrative system/method for migrating components in accordance with a data mirroring method.

Referring to FIG. 6, a data mirroring model is illustratively shown. An application, database, etc. (App, DB) 170 all use storage 174, plus possibly some local storage, e.g., for the code. We assume that the local storage needs no resynchronization (read-only or temporary). The local storage is copied from block 170 to block 172. Storage 174 is likewise copied to storage 176 using a synchronizing technique. Block 172 is switched on and locally tested. If the test succeeds, block 170 is switched off and storage 174 and 176 are resynchronized. A client network 178 then cuts over to the migrated components. The costs in this case can be determined similarly to the other described cases.

While the present principles may investigate a single best mode for optimizing efficiency based on cost, a combination of methods may be employed. To optimize the method of migration for application availability and reduce complexity, multiple migration approaches may be employed for different move groups. For example, in one analysis, the methods of FIGS. 3-6 are evaluated for risk and cost. 1. Data mirroring: Data is mirrored and synchronized to a duplicate environment, typically using a vendor software tool. This has lower risk and higher cost. 2. Workload shifting: Redundant or backup equipment is used to create a duplicate environment during the relocation of original workload. This has lower risk and moderate cost. 3. Backup and restore: Data is backed up and the backup is restored to a system at the new location. This has moderate risk and moderate cost. 4. De-install and re-install: System is shut down, de-installed and then moved to new site and reinstalled. This has higher risk and lower cost.

Portions of a migration activity may select one method over the others. A best solution may be in the combination of methods. For example, some groupings or waves may be of higher importance and so less risk can be tolerated. Data mirroring may be employed to move the components of higher importance while other methods (e.g., de-install/re-install) may be employed for others. All affinity groups are preferably planned at once, but one may also iteratively find one or a few cheapest affinity groups and perform migration of those first.

Details of a mathematical formulation of the optimization problem (block 112) will now be described. The formulation turns cost types into inputs for a problem solver. The details are illustrative and only cover a subset of the cost types and constraints that have been mentioned with reference to FIGS. 3-6.

Mathematical Problem Formulation: Let $S=\{1, \ldots, n\}$ be the set of servers to be migrated. More generally, these could be any kind of objects, but in data center relocations they are servers. In the following, we abbreviate affinity groups as "waves". Let W be a set of wave indices, say $W=\{1, \ldots, n\}$. $|W|$ will likely be much smaller than n, but n is a safe limit. Existing graph partitioning methods may split groups into a fixed number k of partitions, e.g., k=2.

Let $Wave_w \subseteq S$ denote the servers in wave w. This is what we have to plan. In some wave planning problems, the indices do not matter, only the set $Waves=\{Waves|w \in W\}$. In other wave planning problems, we can use the indices as the planned order of the waves.

Let $d \in \{0,1\}^{S \times W}$ be a 0-1 matrix where $d(s,t)$ denotes whether a direct dependency from server s to server t exists, and d* similarly for transitive dependencies. We now define constraints and cost models.

Partitioning and Maximum Wave Sizes: Waves may include a partitioning of the set of servers, i.e., each server is migrated precisely once:

$$\forall s \in S: |\{w \in W | s \in Wave_w\}|=1.$$

Thus, we assume that the decision what to move has been made before the wave planning. We also assume that any splitting of server applications needed is a separate task and has been performed beforehand; in data center relocations this is rare.

We assume that the waves cannot exceed a certain size, e.g., personnel limits, space on a truck, etc. For a constant MaxWave, we say:

$$\forall w \in W: |Wave_w| \leq MaxWave.$$

Relink Costs: In a first cost model, we assume the only costs occur by relinking applications after the migration, i.e., we assume that moved applications get different addresses, and that other applications with direct dependencies on them need to have those addresses changed. Initially, let us assume unit costs for relinking one dependency. This is more realistic than unit costs for each server that needs relinking. Thus, the relink costs for wave w include: relink_cost$(w) = |\{(s,t) | d(s,t) \wedge s \notin Wave_w \wedge t \in Wave_w\}|$.

Our goal function is to minimize:

$$\text{relink\_cost\_all} = \sum_{w \in W} \text{relink\_cost}(w).$$

We omit the costs for the migration of the wave itself here, assuming that migrating each server s has a fixed migrate cost, cos t(s). The overall cost for this part of the work is $\Sigma_s$ migrate_cos t(s) independent of the wave partitioning. If we want to start with the cheapest wave, we also need to consider the cost:

$$\text{inner\_cost}(w) = \sum_{s \in Wave_W} \text{migrate\_cost}(s) \text{ of each wave.}$$

Business Application Testing: In a second cost model, we assume that it is known which servers belong to which business application, and that business applications are tested as a whole. These tests are a major cost factor. The knowledge about business applications may initially come from knowing certain entry points for these business applications and tracing dependencies from there, but now we assume that this has already be done. Thus, we have an additional labeling of the servers, i.e., the vertices of the dependency graph. Let $B = \{1, \ldots, b\}$ be the set of business application indices and $BA_b \subseteq S$ the servers belonging to business application b. We do not require that the sets $BA_b$ form a partition of S. We assume specific test costs test_ba$_b$ for each business application $b \in B$, independent of how much of this business application was changed. This is realistic because there are usually no special test plans for migrations in place.

When migrating a wave, we have to test all business applications that occur in the wave, as well as those of the servers where relinking occurs. For each wave w, let the outside servers that need relinking be: Relink$_w = \{s \in S | s \notin Wave_w \wedge \exists t \in Wave_w : d(s,t) \wedge t \in Wave_w\}$. Then, all servers modified during a wave are: Modified$_w = Wave_w \cup Relink_w$. We can omit the condition $s \notin Wave$ in Relink$_w$ without changing Modified$_w$ if that makes the overall formula simpler for a solver.

The set of business applications modified during a wave w is therefore: Modified_BA$_w = \{b \in B | Modified_w \cap BA_b \neq \phi\}$. Now, the cost of testing these business applications is:

$$\text{test\_cost}_w = \sum_{b \in \text{Modified\_BA}_w} \text{test\_ba}_b.$$

We may also consider fixed transport costs and other general overhead per wave; if these are a constant wave_gen, the overall cost for this is: move_cos $t = |\{w | Wave_w \neq \phi\}| \cdot$ wave_gen. In another scenario, instead of assuming everything will be moved, we may also have to choose what to move, or have connections to servers that cannot be moved. Instead of assuming a fixed maximum size for waves, we could use cost factors for larger waves, or constraints on the cost per wave. Another adjustment may include evaluating test costs if finer test methods are used for migration, e.g., less testing for relinking alone, etc.

We may employ an open-source solver GLPK (GNU Linear Programming Kit). The solver's input language may be the GNU MathProg modeling language, a subset of AMPL (A Mathematical Programming Language), which is also understood by several other solvers. GLPK permits no optimization over sets, hence we rewrite everything with parameter arrays.

Let inwave $\in \{0,1\}^{S \times W}$ be a 0-1 matrix where inwave(s,w) denotes whether server s belongs to wave w, i.e., whether $s \in Wave_w$. This is our main optimization variable. We can declare binary variables in AMPL. The dependency matrices d and d* become parameters in AMPL. The partitioning constraint becomes:

$$\forall s \in S: \sum_{w \in W} \text{inwave}(s, w) = 1).$$

The wave size constraint becomes:

$$\forall w \in W: \sum_{s \in S} \text{inwave}(s, w) \leq MaxWave.$$

The relink costs per wave becomes:

$$\text{relink\_cost}(w) = \sum_{s,t \in S} d(s, t)(1 - \text{inwave}(s, w))\text{inwave}(t, w).$$

This is not a linear cost since we multiply two of our unknown inwave parameters. We can get rid of this multiplication by additional variables. One way is from Andrew Makhorin's maxcut function, which is known in the art. If a and b are binary variables, and we define two additional binary variables s and t and require s+2t=a+b, then s=a∧b and t=a⊕b. Here, we need the AND. Another is to only bound the term on the safe side. For the relink cost, as it will be minimized later, it is enough to give a lower bound. For the need to relink server s during wave w, we can use: $\forall t \in S$:relink_need$(s,w) \geq d(s,t) \cdot (\text{inwave}(t,w) - \text{inwave}(s,w))$.

This means that if s and t are connected and t in wave w and s is not, then relink_need$(s,w) \geq 1$.

Taking:

$$\text{relink\_cost}^*(w) = \sum_{s,t \in S} d(s, t)\text{inwave}(t, w),$$

but then the overall sum is simply constant, as follows:

$$\text{relink\_cost\_all}^*(w) = \sum_{w \in W} \sum_{s,t \in S} d(s,t) \text{inwave}(t,w)$$

$$= \sum_{s,t \in S} d(s,t) \left( \sum_{w \in W} \text{inwave}(t,w) \right)$$

$$= \sum_{s,t \in S} d(s,t)$$

Business Application Testing: For business applications, let inba(s,b) be a 0-1 matrix denoting whether server s belongs to business application b, i.e., whether $s \in BA_b$. We first derive a 0-1 matrix modified_server(s,w) denoting whether server s is modified by wave w, i.e., it either belongs to w or needs relinking:

$$\text{modified\_server}(s,w) = 1 \Leftrightarrow \left( \text{inwave}(s,w) + \sum_{t \in S} d(s,t) \cdot \text{inwave}(t,w) \right) > 0.$$

We can rewrite this as:

$$\text{modified\_server}(s,w) = \min\left(1, \text{inwave}(s,w) + \sum_{t \in S} d(s,t) \cdot \text{inwave}(t,w) \right).$$

If minima are allowed this is still linear. However, it seems minima are only allowed over input parameters, not over variables in GLPK. We can proceed as above (this is a Boolean OR). The version with inequalities provides: $\forall s \in S, w \in W$:modified_server(s,w)≥inwave[s,w]; $\forall s,t \in S, w \in W$: modfied_server(s,w)≥d(s,t)·inwave(t,w), which works in GLPK.

Similarly one can derive a 0-1 matrix modified_ba(b,w) denoting whether business application b is modified by wave w, i.e., at least one of its servers is modified:

$\forall b \in B, w \in W, s \in S$:modified_ba[b,w]≥inba(s,b)·modified_server(s,w)

Again, we have a sizable number of additional constraints. We can attempt to perform more precomputations on input parameters alone: Let the 0-1 matrix touched ba(s,b) denote whether business application b is affected by the migration of server s. Thus, s_touches_ba(s,b)=inba(s,b) $\vee \exists t \in S$:d(s,t). This can be solved in the solver as a minimum because no variables are involved, otherwise the equation can be precomputed outside the solver. If business applications were defined a priori to be closed under forward dependencies, then this task would already be performed by the closure precomputation.

Now the test cost for wave w becomes:

$$\text{test\_cost}(w) = \sum_{b \in B} \text{test\_ba}(b)(\exists s \in S: \text{s\_touches\_ba}(s,b) \cdot \text{inwaves}(s,w))Thi$$

s leads to a 3-dimensional constraint set:

$\forall b \in B, w \in W, s \in S$:w_touches_ba(w,b)≥s_touches_ba(s,b)·inwave(s,w).

Move costs may include:

$$\text{move\_cost} = \sum_{w \in W} \min\left(1, \sum_{s \in S} \text{inwave}(s,w) \right).$$

Figure 7:
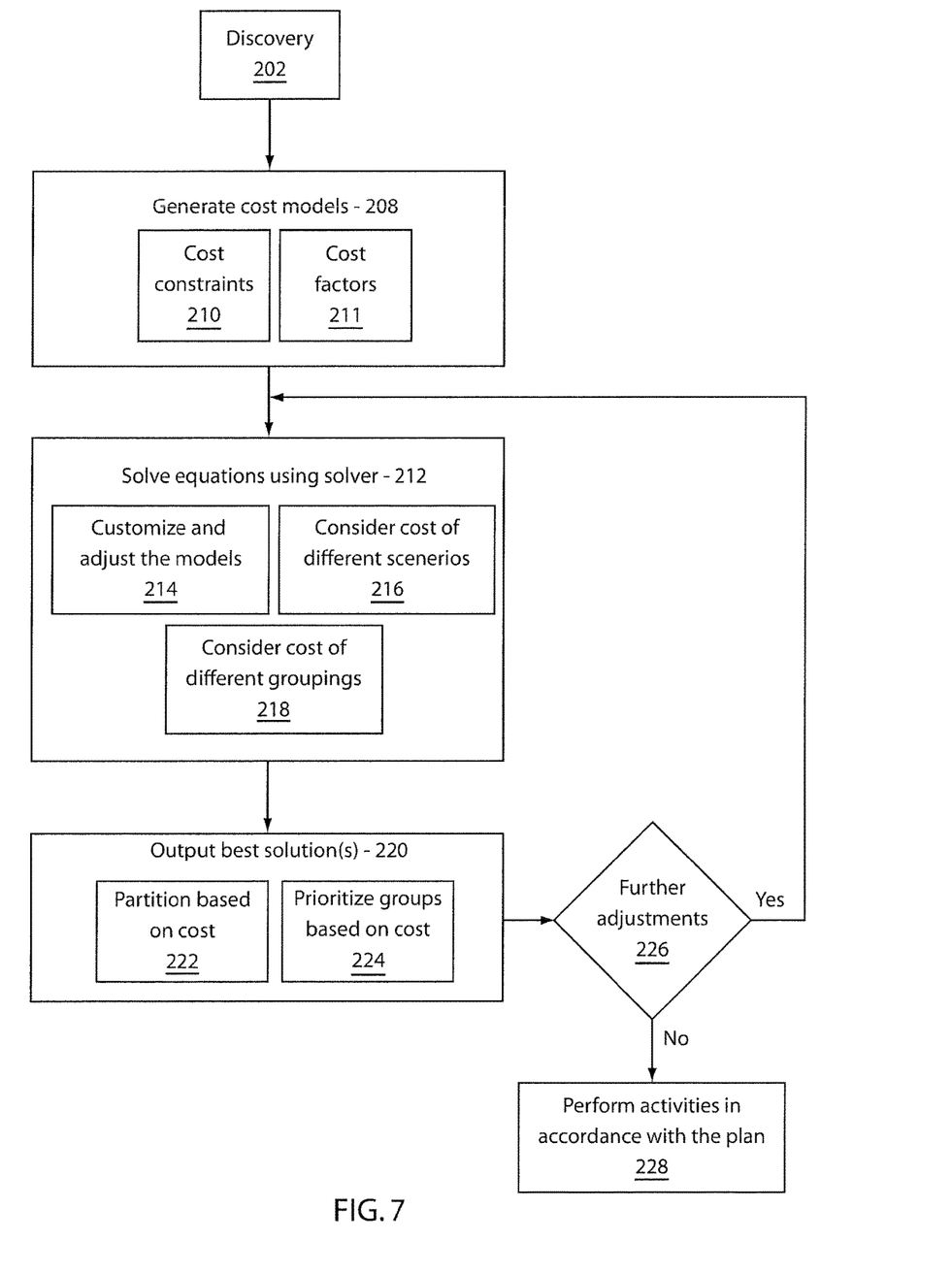
FIG. 7 is a block/flow diagram, showing an illustrative system/method for planning migration/transformation of groups of components and/or for cost-based grouping of the components in accordance with the present principles.

Referring to FIG. 7, a system/method for migration planning using cost is illustratively depicted. In block 202, a discovery phase may be conducted to discover dependencies, the scope of the migration, etc. In block 208, cost models for affinity groups and/or for different transport modes are generated. These models may be created through simulation, analytically (math models), based on experience, etc. The cost models may begin with a generic model which is configured to model a particular transformation activity. These generic models may be customized as needed.

In block 210, the cost models consider cost constraints, such as scheduling time, risks and other contingencies, special circumstances (e.g., time of year in which a move may occur, etc.), people, etc. An example, of a constraint or restriction may be "don't put server A and B on a same truck", "server C can only move on Mondays", etc.

In block 211, the costs models consider cost factors, such as, actual costs, business costs (including down time, and labor costs), fixed costs, risks, testing, etc. These costs factors may be assigned a monetary value to be factored into the decision process. For example, cost factors may include actual cost in money, such as, packing a physical server (cost $100), a truck trip (cost $500), etc.

Depending on a given migration scenario, the cost models, items to be migrated and the constraints and factors may be completely coded as a system of equations or other optimization mechanism and solved by a solver in block 212. However, some constraints, migration priorities, etc. may not be easily coded and may rely on human intervention to make decisions.

In block 214, adjustments and optimizations may be made to the models and to the underlying information used by the models. These customizations may be employed to account for constraints or factors that cannot be easily coded or that need to be updated based upon a last solution. In block 216, costs for different moving scenarios and combinations of scenarios may be considered. For example, the scenarios in FIGS. 3-6 may be modeled and considered for a plurality of affinity groups, hardware components, etc. The cost models may be employed in what-if-scenarios, e.g., to compute and compare the costs of multiple affinity groupings by existing methods or manually, or by using a problem solver to determine an optimal or heuristically good solution. The cost model may also include a risk model. In one instance, costs may be associated with probability distributions, e.g., of being late with certain tasks. In this way, different scenario options are analyzed based on cost to permit a selection of one scenario over another. In addition, scenarios may be combined to generate an improved solution by splitting up migration activities, if possible, for example, migrating one group of servers or even a portion of server content by one mode of transportation and another group of servers or a portion of the content by another mode. This can be decided by solving the models. Other scenarios are contemplated as well.

In block 218, costs of migration may be determined based on parameters such as how to split a data center into waves and order waves. Migration order or priority may have a cost impact. A grouping scheme may be determined based on these costs. Here, e.g., cost may include the cost of migration and the cost of testing. Testing strongly depends on the order of migration. The cost functions may be adjusted with other restrictions (such as, e.g., people available for concurrent migrations of a given type) and form a system of equations.

In block 212, the cost models, considerations for adjusted models, different migration scenarios and different item groupings and orders are unified into the system of equations or other optimization system. The equations are entered into the solver which computes a best partitioning of a system, e.g., a data center, etc. into waves and waves ordering (some waves can be migrated concurrently) based upon cost. Additional constraints can, of course, be specified as well (e.g., migrate application "A" last).

In block 220, a best solution is output giving a most efficient cost scenario and/or grouping (or combinations thereof) for implementing a migration or transformation. This may include a best grouping scheme for components, a migration order for components and/or a best mode for transporting the components, etc. This results in an economically based migration plan.

In block 222, the solution may include groups with partitions created using the cost analysis in accordance with the present principles. The partitioning of affinity groups for a migration or transformation are output based on the cost analysis. The groups may be partitioned based upon other criteria as well or a combination of costs and other criteria, e.g., customer priorities, system or component importance, dependencies, etc. In block 224, cost may be employed to determine how to migrate the system components, e.g., in what order, etc., or to assist in determining a priority order for migration.

In block 226, a determination is made as to whether further tweaking or adjustments are needed. If so, the path returns to block 212. Otherwise, the path proceeds to block 228. In block 228, the migration/transformation activities are performed in accordance with the cost-based plan as output in block 220.

Figure 8:
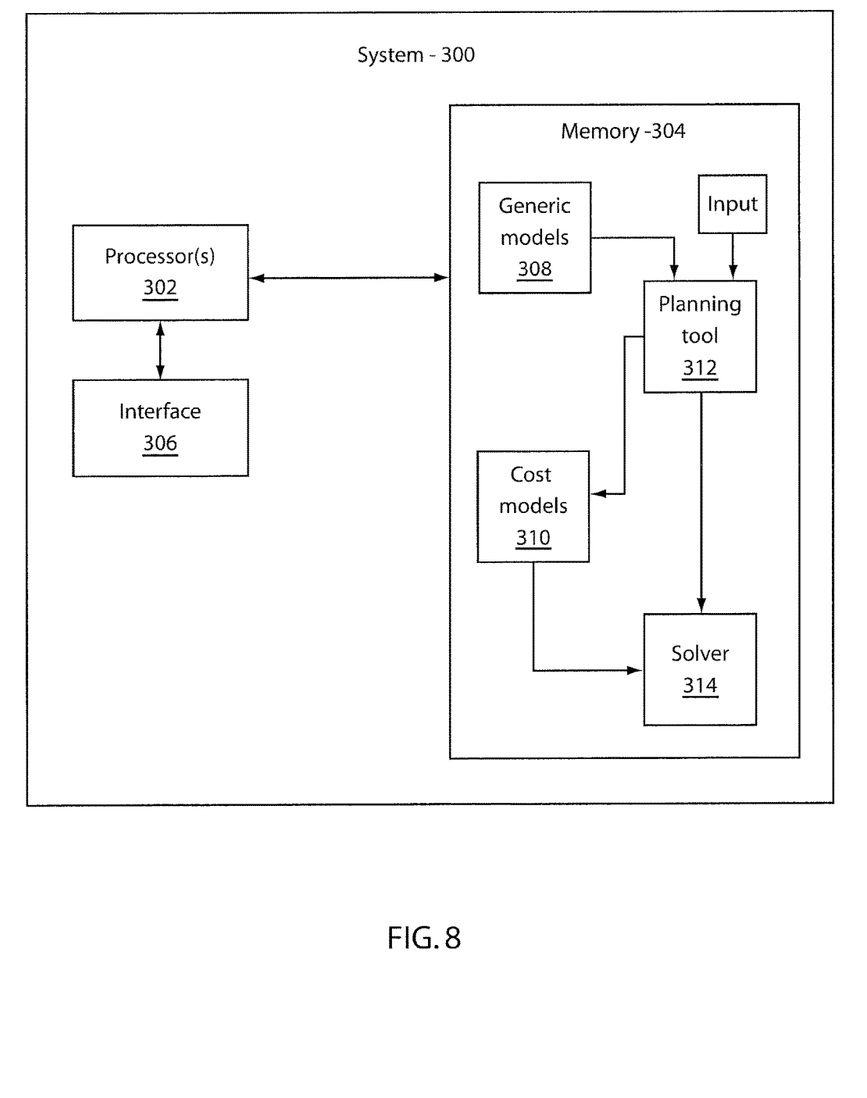
FIG. 8 is a block/flow diagram, showing an illustrative system for planning migration/transformation of groups of components and/or for cost-based grouping of the components in accordance with the present principles.

Referring to FIG. 8, a system 300 for implementing a cost analysis for planning a migration or transformation is illustratively depicted. System 300 includes one or more processors 302, a memory 304 and a user interface 306. The memory stores generic models 308 which may be converted to model instances 310 using a planning tool 312. Tool 312 permits a user to input cost factors and data (Input) into generic models to create the model instances 310. A solver 314 may be provided to run optimizations of the models, to evaluate different scenarios, and compare cost-based migration results to determine a best cost-based solution. Once output from the solver 314, a plan based on costs may be reviewed by a user or may be implemented to perform a migration or other activity.

Having described preferred embodiments of a system and method for cost-based migration waves planning (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for cost-based migration, comprising:
    determining cost factors and constraints associated with migrating and transforming a plurality of components, wherein the cost factors include at least a cost of data migration, a cost of testing at least one of the plurality of components, and a cost of business losses resulting from the migrating;
    constructing at least one cost-based model using the cost factors and constraints, wherein the constraints include migration scheduling times, legal considerations, modes of migration, and special circumstances;
    applying, using a processor, the at least one cost-based model to generated affinity groupings of the plurality of components to provide a cost-based determination of a grouping scheme in accordance with the constraints; and
    migrating and transforming, using a processor, each of the plurality of components in migration waves generated based on the affinity grouping scheme generated by the determining of the cost factors, the constructing of the cost-based model, and the applying of the cost-based model to the groupings of the plurality of components, the migrating being configured to optimize application availability and to reduce complexity of the migration while minimizing costs by prioritizing the migration waves and employing different migration techniques for each of a plurality of different types of migration groups, the different migration techniques including two or more of data mirroring, workload shifting, backup and restore, de-install, and re-install.

2. The method as recited in claim 1, wherein determining cost factors and constraints includes determining constraints by conducting a discovery analysis of the plurality of components.

3. The method as recited in claim 1, wherein constructing at least one cost-based model includes creating a model instance from a generic model using the cost factors and constraints.

4. The method as recited in claim 1, further comprising determining an order for moving the plurality of groupings using the at least one cost model.

5. The method as recited in claim 1, further comprising adjusting the at least one cost model to perform what-if scenarios leading to one or more groupings.

6. The method as recited in claim 1, wherein applying the at least one cost-based model includes employing a solver to determine the cost-based grouping scheme.

7. The method as recited in claim 1, wherein applying the at least one cost-based model to groupings of the plurality of components includes determining a plurality of alternative scenarios and comparing the alternative scenarios based on cost.

8. The method as recited in claim 1, wherein the cost factors include actual physical and data migration costs, testing costs, relinking costs and business costs.

9. The method as recited in claim 1, wherein the constraints include at least one of a budget, component dependencies, downtime constraints, personnel constraints, bandwidth and risks, and the constraints may be modified until a goal is met, a threshold is reached, or a user is satisfied.

10. The method as recited in claim 1, further comprising adjusting the at least one cost model to perform what-if scenarios leading to a migration order for groupings.

11. A non-transitory computer readable storage medium comprising a computer readable program for cost-based migration, wherein the computer readable program when executed on a computer causes the computer to perform the steps of:
    determining cost factors and constraints associated with migrating and transforming a plurality of components, wherein the cost factors include at least a cost of data migration, a cost of testing at least one of the plurality of components, and a cost of business losses resulting from the migrating;

constructing at least one cost-based model, stored in a computer readable storage medium, using the cost factors and constraints, wherein the constraints include migration scheduling times, legal considerations, modes of migration, and special circumstances;

applying the at least one cost-based model to generated affinity groupings of the plurality of components to provide a cost-based determination of a grouping scheme in accordance with the constraints; and migrating and transforming, using a processor, each of the plurality of components in migration waves generated based on the affinity grouping scheme generated by the determining of the cost factors, the constructing of the cost-based model, and the applying of the cost-based model to the groupings of the plurality of components, the migrating being configured to optimize application availability and to reduce complexity of the migration while minimizing costs by prioritizing the migration waves and employing different migration techniques for different types of migration groups, the different migration techniques including two or more of data mirroring, workload shifting, backup and restore, de-install, and re-install.

12. The computer readable storage medium as recited in claim 11, wherein determining cost factors and constraints includes determining constraints by conducting a discovery analysis of the plurality of components.

13. The computer readable storage medium as recited in claim 11, wherein constructing at least one cost-based model includes creating a model instance from a generic model using the cost factors and constraints, with the cost factors being actual physical and data migration costs, testing costs, relinking costs and business costs.

14. The computer readable storage medium as recited in claim 11, further comprising determining an order for moving the plurality of groupings using the at least one cost model.

15. The computer readable storage medium as recited in claim 11, further comprising adjusting the at least one cost model to perform what-if scenarios on one of the groupings and a migration order for the groupings.

16. The computer readable storage medium as recited in claim 11, wherein applying the at least one cost-based model includes employing a solver to determine the cost-based grouping scheme.

17. The computer readable storage medium as recited in claim 11, wherein applying the at least one cost-based model to groupings of the plurality of components includes determining a plurality of alternative scenarios and comparing the alternative scenarios based on cost.

18. A system for cost-based migration, comprising:
a memory coupled to a processor, the memory storing a cost-based planning tool which is executed by the processor to:
determine cost factors and constraints associated with migrating and transforming a plurality of components, wherein the cost factors include at least a cost of data migration, a cost of testing at least one of the plurality of components, and a cost of business losses resulting from the migrating;

construct at least one cost-based model using the cost factors and constraints, wherein the constraints include migration scheduling times, legal considerations, modes of migration, and special circumstances;

apply the at least one cost-based model to generated affinity groupings of the plurality of components to determine a cost-based grouping scheme in accordance with the constraints; and migrating and transforming, using the processor, each of the plurality of components in migration waves generated based on the affinity grouping scheme generated by the determining of the cost factors, the constructing of the cost-based model, and the applying of the cost-based model to the groupings of the plurality of components, the migrating being configured to optimize application availability and to reduce complexity of the migration while minimizing costs by prioritizing the migration waves and employing different migration techniques for each of a plurality of different types of migration groups, the different migration techniques including two or more of data mirroring, workload shifting, backup and restore, de-install, and re-install.

19. The system as recited in claim 18, wherein the cost factors include actual physical and data migration costs, testing costs, relinking costs and business costs.

20. The system as recited in claim 18, wherein the constraints include at least one of a budget, component dependencies, and risks, and the constraints may be modified until a goal is met, a threshold is reached, or a user is satisfied.

21. The system as recited in claim 18, wherein the at least one cost-based model is created from a generic model using the cost factors and constraints.

22. The system as recited in claim 18, wherein the cost-based planning tool is configured to determine an order for moving the plurality of groupings using the at least one cost model.

23. The system as recited in claim 18, wherein the cost-based planning tool is configured to adjust the at least one cost model to perform what-if scenarios on one of the groupings and a migration order for the groupings.

24. The system as recited in claim 18, wherein the cost-based planning tool includes a solver to determine the cost-based grouping scheme.

25. The system as recited in claim 18, wherein the cost-based planning tool is configured to determine a plurality of alternative scenarios and compare the alternative scenarios based on cost.

* * * * *